United States Patent Office 2,902,492
Patented Sept. 1, 1959

2,902,492
METHOD FOR PREPARING KAINIC ACID AND ITS DERIVATIVES, AND INTERMEDIATE THEREOF

Yoshio Ueno, Takarazuka, Japan, assignor to Takeda Pharmaceutical Industries, Ltd., Osaka, Japan No Drawing. Application February 12, 1957
Serial No. 639,608

Claims priority, application Japan May 7, 1955

7 Claims. (Cl. 260—326.3)

This invention relates to a method for preparing kainic acid and its derivatives, and to intermediate thereof. This case is a continuation-in-part of copending application, Serial No. 581,848, filed May 1, 1956 (and abandoned since the filing of the present application).

Digenea simplex Ag. has been known from ancient times as an anthelmintic against ascaris, but its active ingredient had not been clarified until recently. Shinzo Murakami and Tsunematsu Takemoto have succeeded at last in isolating an active component of this vegetable drug and named it kainic acid (J. Pharm. Soc. Japan 73, 1055 (1953); ibid., 74, 560 (1954)). And the anthelmintic activity of this substance was also reported in J. Pharm. Soc. Japan 73, 1026 (1953) and ibid., 75, 1253 (1955).

The present inventor established the structure of the substance as 2-carboxy-3-carboxymethyl-4-isopropenyl-pyrrolidine (J. Pharm. Soc. Japan 75, 843 (1955)),

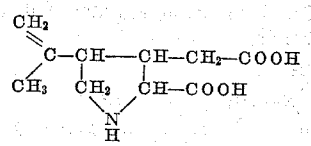

As is evident from the structure, kainic acid has eight isomers. Namely the substituents at 2-, 3- and 4-positions of the pyrrolidine nucleus can take the following four racemic forms: trans/cis, cis/cis, trans/trans, cis/trans, and they are designated as α-, β-, α-allo- and β-allo-configurations, respectively. And each of these four racemates has L- and D-forms according to the configuration of the carboxyl radical to the imino radical.

The present inventor found that it is possible to synthesize kainic acid, its ester and N-substituted compounds. Kainic acid described hereinafter includes all of the eight isomers.

The present invention is based on the finding that kainic acid or its ester or its N-substituted compound is obtained when the substituent $R^1$ of a compound having the structure without considering the steric configuration

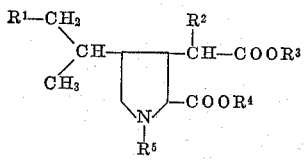

is eliminated together with the α-hydrogen of the β-substituted isopropyl radical to form a double bond.

In the above formula the symbols signify as follows: $R^1$ is a dialkylamino radical such as dimethylamino, diethylamino and piperidino, $R^2$ is hydrogen or a carbalkoxy radical such as carbomethoxy and carbethoxy, $R^3$ and $R^4$ are same or different radicals representing hydrogen or alkyl such as methyl, ethyl, propyl and butyl, and $R^5$ is hydrogen, acyl such as acetyl, propionyl and benzoyl, or carbalkoxy such as carbomethoxy and carbethoxy.

The above-mentioned starting material is synthesized via the path exemplified hereunder.

(i) An ester of N-carbalkoxy-N-[2-(β-dialkylamino-isopropyl)-2-carbalkoxyethyl]-glycine is treated with metallic alkali to obtain N-carbalkoxy-2-carbalkoxy-4-(β-dialkylaminoisopropyl)-pyrrolidone-(3), and the product is hydrogenated to the corresponding 3-hydroxy compound. The 3-hydroxy compound is further led to the 3-acetoxy or 3-halogen derivative, which is condensed with malonic ester to give N-carbalkoxy-2-carbalkoxy-3-dicarbalkoxymethyl-4-(β-alkoxyisopropyl)-pyrrolidine. When the 3-carbalkoymethyl compound is desired, the 3-dicarbalkoxymethyl product is partially hydrolyzed and then decarboxylated. When N-acyl-N-[2-(β-dialkylaminoisopropyl)-2-carbalkoxyethyl]-glycine is used as material, the product has also acyl as the N-substituent.

(ii) 1-acetyl-5-(2'-dialkylaminoisopropyl)-2-piperidone-3-ene is condensed with malonic ester to form 4-dicarbalkoxymethyl compound, and the residual hydrogen of the malanic ester radical of the product is halogenated. And the halogenated compound is treated with alkali to open the piperidone ring between 1- and 2-positions to form 2-carboxy-3-carboxymethyl-4-(2'- - dialkylaminoisopropyl)-pyrrolidine. The product can be esterified and/or N-substituted by conventional processes.

Starting from the materials thus obtained the desired products of the present invention are prepared as follows.

When the substituent $R^1$ is a dialkylamino radical, it is eliminated together with the α-hydrogen of the β-substituted isopropyl radical as under: the material is treated with an alkylhalide to produce the corresponding quaternary ammonium halogenide, and the product is subjected to Hofmann's degradation under heating in the presence of an alkaline substance. Methyl iodide, methyl bromide or ethyl iodide is conveniently used as alkyl halide for the purpose. Degradation of the quaternary ammonium halogenide is conveniently effected in the presence of such an alkaline substance as alkali or alkali earth metal oxide, hydroxide or carbonate. But most commonly is used silver oxide, hydroxide or carbonate, or sodium or potassium hydroxide or carbonate.

Thus, the starting material is converted into kainic acid or its derivatives.

Similar to kainic acid, the starting material has eight isomers. Each of the isomers may be used as the material, because difference in steric configuration does not affect the method of the present invention. Steric inversion may or may not occur during the reaction.

The product, kainic acid or its derivatives, is separated from the reaction mixture making use of the following characteristics.

Differences between the product and impurities in solubility in the reaction medium or in various solvents, in distribution coefficient in two solvents, in asorbability in various absorbents, and difference between the heavy metal salt of the product and impurities in solubility are utilized for the purpose.

Example

A mixture of 5 g. of 1,2-dicarbethoxy-3-dicarbethoxymethyl-4-(β-dimethylaminoisopropyl)-pyrrolidine, 20 cc. of acetone and 10 cc. of methyl iodide is heated for one hour on the water-bath, and the acetone and excess of the methyl iodide are distilled off, leaving the methiodide of 1,2-dicarbethoxy-3-dicarbethoxymethyl-4-(β-dimethylaminoisopropyl)-pyrrolidine as an oily substance. To this substance is added 50 cc. of water, followed by fresh silver oxide (prepared from 6 g. of silver nitrate and 1.5 g. of sodium hydroxide), and the mixture is shaken for one hour. The precipitate is filtered off. The filtrate is evaporated, and the residue is heated to 180–200° C. in the oil-bath to complete the degradation.

The oily product is distilled under reduced pressure to obtain 3 g. of light yellow viscous liquid. The liquid is dissolved in ether, the solution is washed with diluted hydrochloric acid to remove basic substances, and the dried ether solution is evaporated to obtain light yellow liquid, B.P.$_{0.8}$ 173–175° C.

*Analysis.*—Calcd. for $C_{20}H_{37}O_8N$: C, 58.10, H, 7.56. Found: C, 58.54, H, 7.78.

The product is 1,2-dicarbethoxy-3-dicarbethoxymethyl-4-isopropenyl-pyrrolidine, and its infrared absorption spectrum corresponds to the structure. Catalytic reduction of the product also consumes the theoretical amount of hydrogen. Hydrolysis of the product gives DL-α-allo-kainic acid. Thus obtained product gives L-α-allokainic acid by an optical resolution. And the properties of L-α-allokainic acid such as M.P. 237° C. (decomp.), $[\alpha]_D^{26} = +8.0°$ ($H_2O$) are in well agreement with those of natural L-α-allokainic acid [M.P. 237° C. (decomp.), $[\alpha]_D^{10} = +8.0°$ ($H_2O$)].

What is claimed is:

1. A compound having the structure representable by the formula,

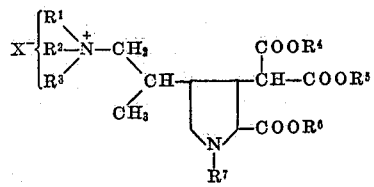

wherein each of $R^1$, $R^2$, $R^3$, $R^4$, $R^5$ and $R^6$ is lower alkyl, $R^7$ represents a member selected from the group consisting of hydrogen, acetyl and lower carbalkoxy, and X is halogen.

2. A compound having the formula

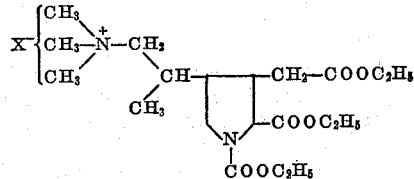

wherein X is halogen.

3. A compound having the formula

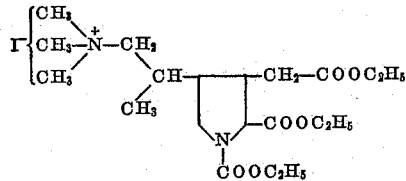

4. A compound having the formula

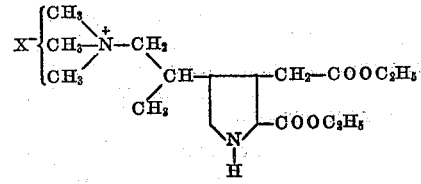

wherein X is halogen.

5. A compound having the formula

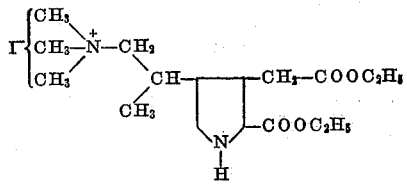

6. A process for preparing DL-allo-kainic acid, which comprises heating on a water bath 1,2-dicarbethoxy-3-dicarbethoxymethyl - 4 - (β - dimethylaminoisopropyl)-pyrrolidine together with methyl iodide to obtain the corresponding trimethylammonium iodide, and then heating the trimethylammonium iodide together with silver oxide to a temperature up to 200° C., and hydrolyzing the product.

7. A process for preparing a compound having the formula

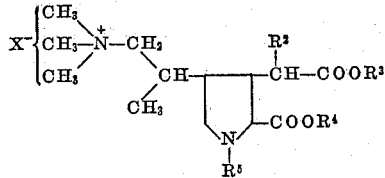

wherein each of $R^2$ and $R^5$ is a member selected from the group consisting of hydrogen and lower carbalkoxy, each of $R^3$ and $R^4$ is a member selected from the group consisting of hydrogen and lower alkyl, and X is halogen, which comprises heating on a water bath a compound having the formula

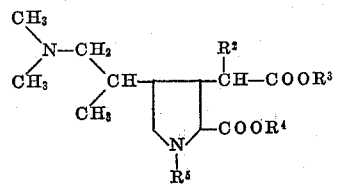

wherein each of $R^2$, $R^3$, $R^4$ and $R^5$ has the previously recited significances, with methyl halide.

References Cited in the file of this patent

UNITED STATES PATENTS 2,599,497     Stoll et al. _____ June 3, 1952

OTHER REFERENCES

P. Karrer: Organic Chemistry, Elsevier, pp. 47–48 (1938).